United States Patent [19]

Ogino et al.

[11] Patent Number: 4,810,940
[45] Date of Patent: Mar. 7, 1989

[54] VERTICAL DEFLECTION CIRCUIT

[75] Inventors: Masanori Ogino, Yokohama; Yoshio Amemiya, Yokosuka; Michiko Okino; Kazuro Washi, both of Yokohama, all of Japan

[73] Assignee: Hitachi, Ltd., Tokyo, Japan

[21] Appl. No.: 181,066

[22] Filed: Apr. 13, 1988

[30] Foreign Application Priority Data

Apr. 13, 1987 [JP] Japan .................................. 62-88809

[51] Int. Cl.$^4$ ........................ H01J 29/70; H01J 29/72
[52] U.S. Cl. ...................................... 315/389; 315/371
[58] Field of Search ............................... 315/389, 371

[56] References Cited

U.S. PATENT DOCUMENTS 3,725,726  4/1973  West .

4,645,987  2/1987  Kiteley et al. ........................ 315/389

Primary Examiner—Theodore M. Blum
Attorney, Agent, or Firm—Antonelli, Terry & Wands

[57] ABSTRACT

A vertical deflection circuit of the negative feedback type wherein a feedback signal, being generated at a terminal of a deflection current detector resistance connected in series with a vertical deflection yoke, is connected to negative feedback amplifier which guides the output of a sawtooth wave generating circuit through a third order distortion wave generating circuit. The third order distortion wave generating circuit imparts third order distortion of positive polarity to said feedback signals, so that third order distortion of negative polarity is imparted to the current of said deflection yoke, and whereby the third order distortion is compensated and extinguished on the CRT display.

6 Claims, 5 Drawing Sheets

VERTICAL DEFLECTION CIRCUIT

BACKGROUND OF THE INVENTION

The present invention relates to a vertical deflection circuit for a CRT display, and more specifically to a linearity compensation circuit of the negative feedback type which is little affected by the change in the capacity of the electrolytic capacitor that is subject to change depending upon the change in the temperature.

In the conventional vertical deflection circuit, the problem fundamentally exists in that the third order linearity distortion (so-called S-shaped distortion) is compensated by using a chemical capacitor with which it is difficult to maintain stability relative to the change in the temperature.

Problems inherent in the prior art will now be described with reference to FIG. 1, wherein reference numeral 1 denotes a vertical sawtooth wave generating circuit, 2 denotes an amplifier circuit, 3 denotes a vertical deflection yoke (having an inductance $L_1$), 4 denotes loss resistance (having a resistance value $R_1$) of the yoke, 5 denotes a chemical capacitor (having a capacity $C_1$) for third order distortion compensation and for DC blocking, reference numeral 7 denotes a negative feedback circuit for stabilizing output voltage bias and for compensating third order distortion and wherein symbols $R_3$, $R_4$ and $C_2$ denote constituent elements therefor, 8 denotes an adder, 9 denotes a potentiometer for adjusting the vertical size, and 10 denotes a potentiometer for compensating second order distortion.

Operation of the circuit as shown in FIG. 1 will now be described. A vertical drive signal VD input to the vertical sawtooth wave generating circuit 1 of FIG. 1 serves as a vertical synchronizing signal for the circuit 1. In synchronism with the above synchronizing signal, a sawtooth wave of a vertical period shown in FIG. 2a is formed on the output 11 of the sawtooth wave generating circuit.

The sawtooth wave is amplified through an amplifier 2 and is applied to the deflection yoke 3. In response thereto, an electric current flows into the deflection yoke 3 and is detected by a detector resistance 6.

In the constructed circuit, there exist three different feedback paths. That is, a first feedback path is a negative feedback path that leads to a negative input terminal of the amplifier 2 via the potentiometer 9 and the adder 8.

A second path is a sub-negative feedback circuit that passes through the negative feedback circuit 7 and the adder 8.

A third path is a positive feedback circuit that leads to the sawtooth wave generating circuit 1 via the potentiometer 10 and a resistor 12 (having a resistance $R_5$). As will be described later, the positive feedback circuit works to cancel the second order distortion that generates accompanying the third order distortion compensation function of the second sub-negative feedback circuit.

An electronic switch SW in the sawtooth wave generating circuit is closed for a short period of time in synchronism with the input vertical synchronizing signal such that the potential of the capacitor Cs is instantaneously charged to the power source voltage Ecc. During the rest period, i.e., during the period in which the electronic switch SW is opened, the potential of the capacitor Cs is gradually discharged due to the collector current of a transistor Q. Thus, the sawtooth wave shown in FIG. 2a is obtained across the terminals of the capacitor Cs, i.e., on the input terminal 11 of the amplifier 2.

The gain of the amplifier 2 is as great as about 60 dB or more. Therefore, the loop gain of the system is sufficiently greater than 1 at a vertical frequency (60 Hz) and at principal higher harmonic frequencies. Therefore, the feedback loop so works that a waveform nearly equal to that of the terminal 11 is formed on the negative input terminal 13 of the amplifier 2. The relationship between a voltage $E_{13}$ at the terminal 13 and a current $I_{DY}$ that flows into the current detector resistance 6 via deflection yoke 3 is given by the following equation based upon the calculation of flow of signals, i.e., $$E_{13} = I_{DY}\left\{ K_9 R_2 + \left(PL_1 + R_1 + R_2 + \frac{1}{PC_1}\right)\frac{K_4}{1+PT_2} \right\} \quad (1)$$

where $$\begin{cases} T_2 = C_2\dfrac{R_3 R_4}{R_3 + R_4} \\ K_4 = \dfrac{R_4}{R_3 + R_4} \\ K_9 = \text{transmission factor of the potentiometer 9,} \\ p = j\omega(\text{complex angular frequency [rad/sec]}). \end{cases}$$

In practice, the value $T_2$ can be selected to be as great as about 100 msec. Therefore, the equation (1) can be modified and approximated in the following way. That is, it $(1+PT_2)$ is approximated to be $PT_2$, then, $$E_{13} \approx E_2\left\{ \left(K_9 + \frac{K_4 L_1}{T_2 R_2}\right) + \frac{K_4(R_1+R_2)}{PT_2 R_2} + \frac{K_4}{p^2 C_1 R_2 T_2} \right\} \quad (2)$$

where $E_2 = I_{DY} \times R_2$

To explain the meaning of the equation (2), first, the practical circuit examples are explained below (in the following examples, pp stands for peak to peak).

| | |
|---|---|
| $L_1 = 8$ mH | $R_3 = 30$ k$\Omega$ |
| $R_1 = 8$ $\Omega$ | $R_4 = 10$ k$\Omega$ |
| $C_1 = 0.36$ mF | $C_2 = 13$ $\mu$F |
| $R_2 = 2$ $\Omega$ | $K_4 = 0.25$ |
| $K_9 = 1.0$ | pp value of $I_{DY}$ = 2App |

If these values are substituted for the equation (2), there are obtained the following equation, $$E_{13} \approx E_2\left\{ 1 + \frac{1}{80\text{ msec}p} + \frac{1}{(17\text{ msec}p)^2} \right\} \quad (3)$$

$$\therefore E_2 \approx E_{13}\left\{ 1 - \frac{1}{80\text{ msec}p} - \frac{1}{(17\text{ msec}p)^2} \right\} \quad (4)$$

$$\therefore \left|\frac{1}{20\text{ msec}p}\right| < < 1 \text{ for } \omega \geq 2\pi \times 60\text{Hz}$$

Based upon the action of negative feedback described above, it can be regarded that the voltage $E_{11}$ at the terminal 11 is equal to the voltage $E_{13}$. Therefore, the following equation is obtained from the equation (4), $$E_2 \approx E_{11}\left(1 - \frac{1}{80 \text{ msec}p} - \frac{1}{(17 \text{ msec}p)^2}\right) \quad (5)$$

It can be interpreted that the equation (5) represents the response of output $E_2 (=I_{DY}R_2)$ that corresponds to the sawtooth input $E_{11}$ of vertical periodicity to the amplifier 2.

The numeral 1 which is the first term in the parenthesis on the right side of the equation (5) just represents the sawtooth wave.

The third term (i.e., the term of double integral $:1/p^2$) represents a so-called S-shaped distortion compensation term.

Described below is the reason why S-shaped distortion is generated.

The reason why S-shaped distortion is generated is because the fluorescent screen of the CRT is flat. If the fluorescent screen were on a spherical surface whose center coincides with the center of the deflection yoke, then S-shaped distortion is not generated. This is because the sine of deflection angle of the CRT varies in proportion to a current that flows into the deflection yoke and the deflection distance on the spherical surface also varies in proportion to the sine of deflection angle. If the deflection angle in the vertical direction is denoted by $\theta$, then the deflection distance on the practical flat fluorescent screen varies in proportion to $\tan\theta$. Therefore, the linearity of vertical deflection $$= \frac{d(\text{deflection distance})}{dI_{DY}} \propto \frac{d \tan\theta}{d \sin\theta} = \frac{1}{\cos^3\theta} \quad (6)$$

$$\approx 1 + \frac{3}{2}\sin^2\theta$$

$$\approx 1 + \frac{3}{2}\tan^2\theta$$

The equation (6) represents a so-called S-shaped distortion in which the top part and bottom part of the screen are extended relative to the central part ($\theta = 0$). Concretely speaking, when the vertical deflection angle is $\theta = \pm 15°$, there develops enlarging distortion of about 11% on the top and bottom part of the screen.

$$\left(\because \frac{3}{2}\tan^2 11° \approx 0.11\right)$$

Thus, the reason why S-shaped dstortion generates is quantitatively comprehended. To compensate the S-shaped distortion, therefore, it is obvious that the deflection speed at the top part and bottom part of the screen must be decreased by about 11% compared with that at the central part of the screen.

Described below is a principle for cancelling the S-shaped distortion by the third term on the right side of the equation (5).

For the purpose of easy explanation, attention is given to the time differentials $\dot{E}_{11}$ and $\dot{E}_2$ instead of $E_{11}$ and $E_2$ in the equation (5).

First, let it be pressumed that $E_{11}$ represents a perfect sawtooth wave. Then, $\dot{E}_{11}$ represents a perfect pulse wave of a vertical periodicity. In FIG. 2, $E_{11}$ and $\dot{E}_{11}$ represent the above waveforms, and wherein the abscissa represents the time t.

FIG. 2 further illustrates contributions by the second and third terms on the right side of the equation (5). The added result of the first and third terms is illustrated in the bottom column in FIG. 2. In the following consideration, it should be noted that the linearity characteristics is obtained by differentiating the equation (5) with the time t. That is, $$\dot{E}_2 \approx \dot{E}_{11} - \frac{E_{11}}{80 \text{ msec}p} - \frac{E_{11}}{(17 \text{ msec}p)^2} \quad (5')$$

The left side of the above equation represents the differentiation of a voltage across the resistor $R_2$ of FIG. 1. A deflection current is flowing into the resistor $R_2$. Therefore, $\dot{E}_2$ varies in proportion to the rate of change in the deflection current.

The rate of change is given by the sum of the terms in the right side of the equation (5').

The terms of the equation (5') are shown in FIGS. 2a to 2e. It will be understood from FIG. 2 that the S-shaped distortion is compensated by about 11%, i.e., the deflection speed is lowered at the top and bottom parts of the screen. In the foregoing was described the principle for compensating the S-shaped distortion according to the prior art.

The side effects will now be described.

There are two side effects. The first one is a second order distortion represented by the second term in the right side of the equation (5). As will be obvious from the waveform of FIG. 2c, this term contributes to extend the top part of the screen by about 10% and to contract the bottom part of the screen by about 10%. This is because, the waveform shown in FIG. 2c is reduced by 10% at the top part of the screen (at the beginning of scanning) in contrast with the rate of reference change of $-100\%$ of $\dot{E}_{11}$ shown in FIG. 2a. Therefore, the total rate of change of $-110\%$ is achieved.

Generally, the linearity distortion of greater than 5% is detrimental to faithfully reproducing the figures.

In order to cancel the second order linearity distortion, there is added the positive feedback loop that starts from the potentiometer 10 of FIG. 1 via the transistor Q. This loop works to contract the top part of the screen and to expand the bottom part of the screen.

The second side effect is that the circuit is easily affected by the change in the capacitance of the chemical capacitor. As the consideration of the third term of the equation (5) based upon the equations (2) and (1) will indicate, the double integral effect is obtained by using two chemical capacitors $C_1$ and $C_2$. At low temperatures, the capacitances of these capacitors decrease to about 0.7 times. Accordingly, the compensation effect increases to two folds. Therefore, even if the distortion is completely compensated at ordinary temperature, the compensation becomes excessive at low temperatures and the top and bottom parts of the screen are contracted by about 11%. Furthermore, since the cancellation effect is not sufficiently exhibited by the positive feedback loop, the top part of the screen extends more than the bottom part.

As is widely known, furthermore, the capacity of the chemical capacitor tends to decrease after the use of long periods of time. When used for extended periods of time, therefore, the linearity distortion inevitably develops.

At high temperatures, on the other hand, the internal series resistance $R_1$ of the winding of the deflection yoke increases and the second term in the right side of the equation (2) increases correspondingly, causing the second order distortion to increase.

In general, the resistance of the winding increases to about 1.2 times due to initial drift (temperature rise) after the power supply switch is closed. Therefore, the second order distortion of the screen increases by about 1.2 times. Accordingly, the second order distortion on the screen increases from the aforementioned initial value of about 20% to about 24% which is 1.2 times as great.

In the foregoing was described the case where the vertical deflection angle was as relatively small as about $\pm 15$ degrees. As will be understood from the equation (6), the third order linearity distortion usually varies in proportion to the square power of the deflection angle. In the systems having large deflection angles, therefore, the aforementioned problems are further amplified.

In recent years, it has been urged to provide displays that can cope not only with a single vertical scanning frequency but also with a plurality of frequencies (e.g., 40 Hz to 120 Hz). According to the above-mentioned conventional vertical deflection circuit, the principle for compensating the third order distortion is based upon a double integration circuit. Therefore, if the optimization is set at 60 Hz, then the compensation effect decreases to one-fourth at 120 Hz.

Japanese Patent Laid-Open No. 127877/1985 can be quoted as a related prior art. According to the above prior art, however, both the DC components and the AC components exist on a negative feedback loop in the vertical deflection circuit and, hence, effort is made to improve vertical linearity compensation, vertical amplitude adjustment, and to stabilize the bias point of the class B push-pull amplifier.

According to the prior art as will be comprehended from the foregoing description, the double integration circuit is used as means for compensating S-shaped distortion. A circuit for compensating the second order distortion based upon the positive feedback system is also required. According to the prior art, therefore, linearity distortion develops on the screen due to change in the capacity of the chemical capacitors with the change in temperature or with the lapse of time and due to change in the resistance of winding of the deflection yoke with the change in temperature.

SUMMARY OF THE INVENTION

The object of the present invention is to essentially overcome the defects inherent in the aforementioned conventional art. For this purpose, according to the present invention, the third order distortion wave generating circuit without frequency dependency is newly added to a feedback loop circuit of the vertical deflection circuit, in order to compensate and extinguish the third order distortion on the screen by the function of the third order distortion wave generating circuit.

DESCRIPTION OF THE PREFERRED EMBODIMENTS

Figure 3:
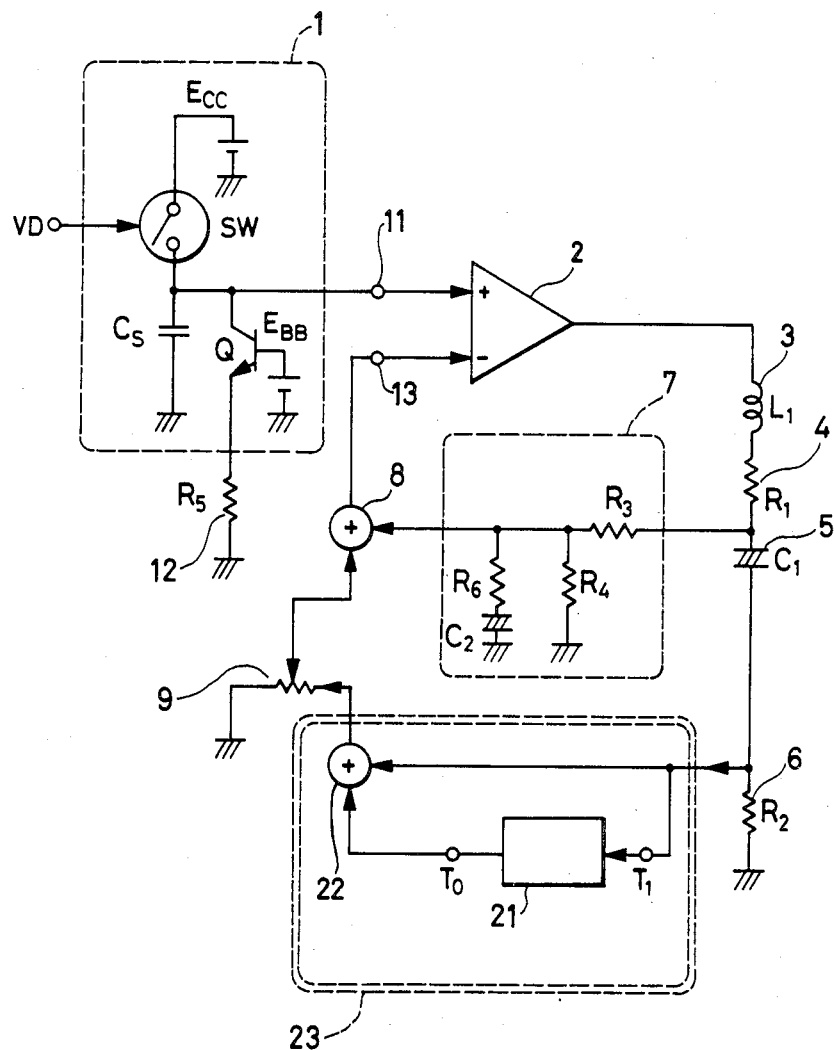
FIG. 3 is a circuit diagram illustrating the structure of a fundamental embodiment of the present invention.

FIG. 3 illustrates a fundamental embodiment of the present invention. A portion 23 surrounded by a double dotted line plays an important role for the invention, and reference numeral 21 denotes a third order wave generating circuit and 22 denotes an adder.

Figure 1:
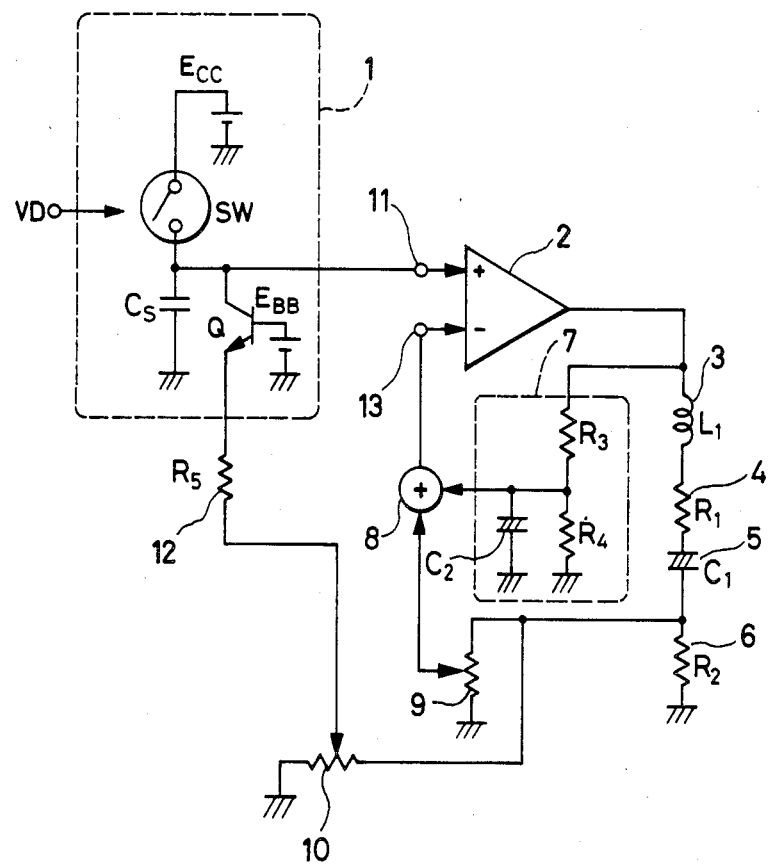
FIG. 1 is a circuit diagram which illustrates the structure of a conventional vertical deflection circuit.
Figure 2A:
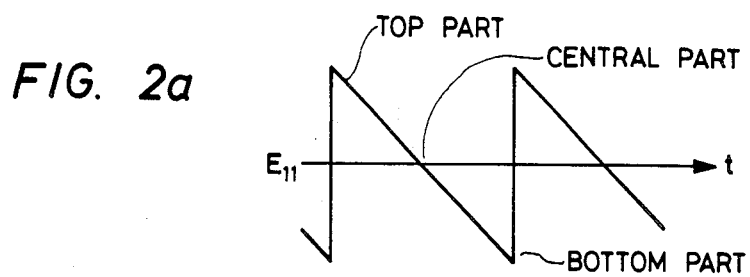
FIGS. 2a-2e show diagrams of waveforms for explaining the principle for compensating the linearity according to the prior art.
Figure 2B:
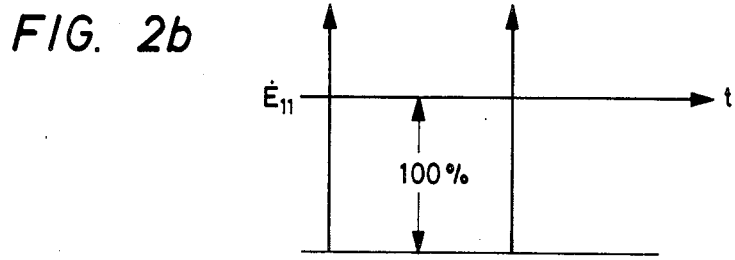
Figure 2C:
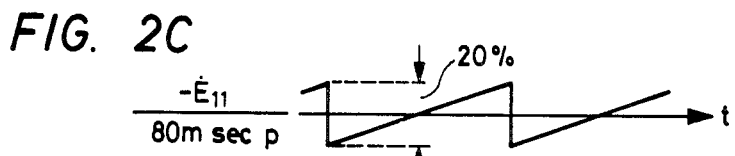
Figure 2D:
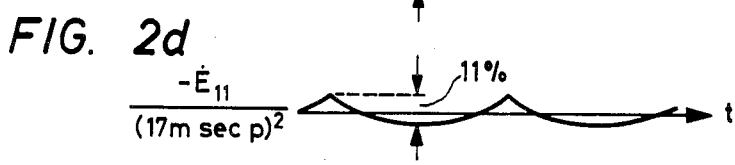
Figure 2E:
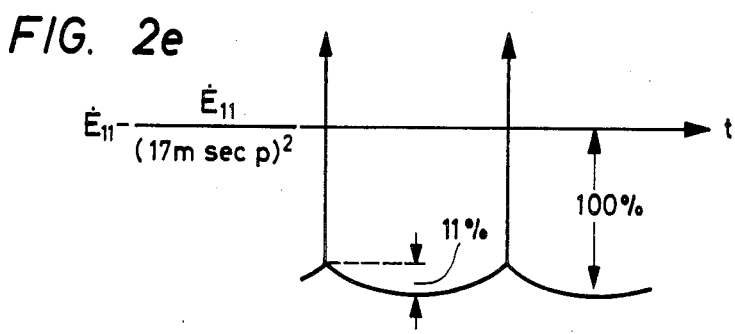

Further, the portions denoted by the same reference numerals as those of FIG. 1 denote the portions that have the same functions.

A portion surrounded by a dotted line 1 is a circuit which generates sawtooth waves of a vertical period, 2 denotes an amplifier circuit having a gain of about 60 dB, $L_1$ denotes a vertical deflection yoke, and $R_1$ denotes internal resistance of $L_1$. Symbol $C_1$ denotes a DC blocking capacitor, and $R_2$ denotes a resistance for detecting a deflection current. A portion of dotted line 7 is an LPF for stabilizing the bias voltage, which has a gain for the vertical frequency components smaller than that of the conventional art. The potentiometer 9 is used for adjusting the picture size.

A relationship between the negative input $E_{13}$ of the amplifier 2 and the potential $E_2$ of the current detecting resistor $R_2$ will now be found quantitatively with the gain of the potentiometer 9 being set to 1 ($K_9=1$), in order to find a gain coefficient A that is required for the third order wave generating circuit 21.

The following equation is obtained through the same step of finding the equation (1), i.e., $$E_{13} = (E_2 + AE_2^3)\left\{1 + \frac{R_2 + \frac{1}{PC_1}}{R_2} \cdot \frac{K_4}{1 + PT_2}\right\} \quad (11)$$

The following equation is obtained through the same step as that of the equation (2); i.e., $$E_{13} \approx (E_2 + AE_2^3)\left(1 + \frac{K_4}{PT_2} + \frac{K_4}{P^2 C_1 R_2 T_2}\right) \quad (12)$$

where $$\left.\begin{array}{l} E_2 = I_{DY}R_2 \\ T_2 = \dfrac{C_2 R_3 R_4}{R_3 + R_4} \\ K_4 = \dfrac{R_4}{R_3 + R_4} \\ p = j\omega \text{(complex angular frequency)} \end{array}\right\} \quad (13)$$

The following equation is obtained through the same step as that of the equation (5), i.e., $$E_2(1 + AE_2^2) = E_{11}\left(1 - \frac{K_4}{PT_2} - \frac{K_4}{P^2C_1R_2T_2}\right) \quad (15)$$

Here, $T_v$ denotes a vertical period (about 16 msec), the origin of time axis is spotted at the center of the screen, and the amplitude pp of the sawtooth wave $E_{11}$ is denoted by $E_0$ and whereby the waveform of $E_{11}$ is expressed by the following equation, $$E_{11} = E_0 \frac{t}{T_v} \text{ for } |t| \leq \frac{T_v}{2} \quad (16)$$

Since $1/p$ is an integrating operator, the above equation is substituted for the equation (15) to obtain the following equation, $$E_2(1 + AE_2^2) \approx \frac{E_0}{T_v}\left(t - \frac{K_4 t^2}{2T_2} - \frac{K_4 t^3}{6C_1R_2T_2}\right) \quad (17)$$

In order to give attention to the linearity, the following equation is obtained by differentiating the above equation with time t, $$E_2(1 + 3AE_2^2) \approx \frac{E_0}{T_v}\left(1 - \frac{K_4 t}{T_2} - \frac{K_4 t^2}{2C_1R_2T_2}\right) \quad (18)$$

To achieve the object of the present invention, it is desired that the second term and the third term in the parenthesis of the equation (18) are limited to be smaller than about 5%, respectively. This is because, the image distortion of smaller than 5% lies within a psychologically permissible range.

Furthermore, the term $AE_2^2$ of the left side should be so set as to cancel the third order distortion.

Therefore, there are obtained the following equations ($t = T_v/2$ is substituted), $$\frac{K_4 T_v}{2T_2} \leq 0.05 \quad (19)$$

$$\frac{K_4 T_v^2}{8C_1R_2T_2} \leq 0.05 \quad (20)$$

$$3AE_2^2 \approx \frac{3}{2}\sin^2\theta \quad (21)$$

where $\theta$ denotes a vertical deflection angle.

Practical examples that satisfy the equations (19), (20) and (21) are as given below.

$$\left.\begin{array}{l} L_1 = 8 \text{ mH} \quad R_3 = 15 \text{ k}\Omega \\ R_1 = 8\Omega \quad R_4 = 3.3 \text{ k}\Omega \\ C_1 = 1 \text{ mF} \quad C_2 = 22 \text{ }\mu\text{F} \\ R_2 = 2\Omega \quad R_4 = 0.18 \\ K_9 = 1.0 \quad pp \text{ value of } I_{DY} \approx 2A_{pp} \end{array}\right\} T_2 \approx 60 \text{ msec}$$

$$A = \frac{0.11}{3(2V)^2}$$

If the equations (19), (20) and (21) are calculated for the above constants while substituting $T_v = 16$ msec, there are obtained the following equations, $$\frac{K_4 T_v}{2T_2} \approx 0.024 < 0.05 \quad (22)$$

$$\frac{K_4 T_v^2}{8C_1R_2T_2} \approx 0.048 < 0.05 \quad (23)$$

$$3AE_2^2 \approx 0.11 \quad (24)$$

The equations (19) and (20) are the conditions in which the second and third terms can be neglected in the parenthesis of the equation (15). In this case, the equation (15) can be approximated by the following equation, $$E_2(1 + AE_2^2) \approx E_{11} \quad (25)$$

The reasons why the desired S-shape compensation can be achieved in compliance with the equation (25) will now be described in conjunction with FIGS. 4a to 4c.

Figure 4A:
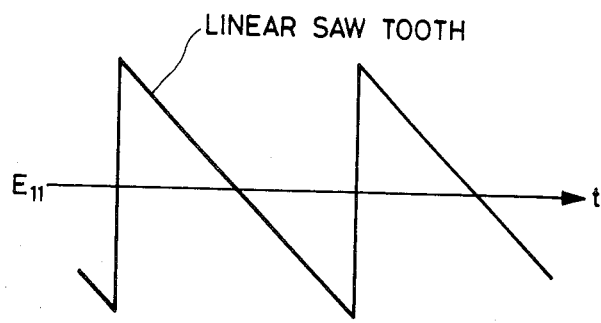
FIGS. 4a-4c show diagrams of waveforms for explaining the principle for compensating the linearity according to the present invention.

In FIG. 4a, $E_{11}$ has a perfect sawtooth waveform.

Figure 4B:
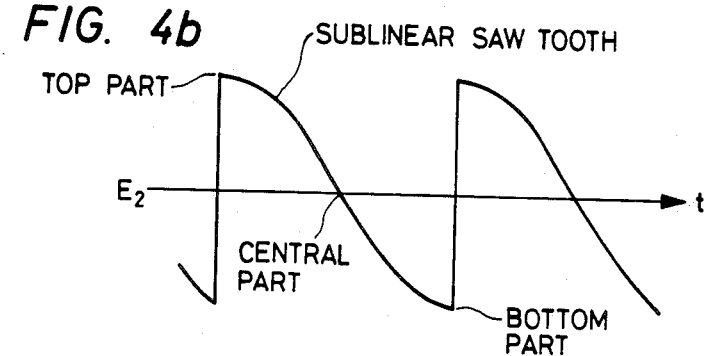
Figure 4C:
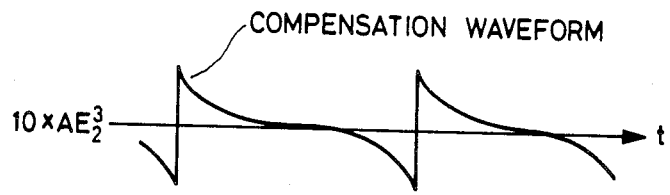

In FIG. 4c, the waveform 10 $AE_2^3$ is described by enlarging the third order distortion wave by 10 times.

In the waveform $E_2$ of FIG. 4b, the gradients of the waveform at the top part and the bottom part of the screen are symmetrically same and they are smaller than the gradient at the central portion, which proves the effect of the S-shaped distortion compensation without accompanied by the second order distortion.

Here, $E_2$ denotes a potential of the current detecting resistor $R_2$ of FIG. 3, which varies in proportion to the current $I_{DY}$ that flows into the deflection yoke.

The non-linear S-shape compensation circuit requires the following attentions to avoid a so-called hunting phenomenon of the loop. Considered below is how to avoid the hunting phenomenon based upon the equation (11).

As mentioned before, the loop gain is so great that the left side $E_{13}$ of the equation (11) can be substituted by $E_{11}$. If $E_2$ is found from the equation (11), there is obtained the following equation, $$E_2(1 + AE_2^2) = E_{11} \frac{1}{1 + \frac{(1 + PC_1R_2)K_4}{PC_1R_2(1 + PT_2)}} = \quad (26)$$

$$\frac{PC_1R_2(1 + PT_2)}{PC_1R_2(1 + PT_2) + (1 + PC_1R_2)K_4}$$

where $$K_4 = \frac{R_4}{R_3 + R_4}$$

If the denominator of the equation (26) is G(p), the G(p) can be modified as follows:

$$\begin{aligned} G(p) &= K_4 + C_1R_2(1 + K_4)p + C_1R_2T_2p^2 \\ &= K_4\{1 + 2\zeta\tau p + (\tau p)^2\} \end{aligned} \quad (27)$$

where $$\begin{cases} \tau = \sqrt{\dfrac{C_1 R_2 T_2}{K_4}} = \sqrt{C_1 R_2 C_2 R_3} & (28) \\ \quad \therefore \text{The above equality holds true from} \\ \quad \text{the equation (13).} \\ \zeta = \dfrac{C_1 R_2 (1 + K_4)}{2\sqrt{K_4 C_1 R_2 T_2}} = \dfrac{\sqrt{C_1 R_2}\,(1 + K_4)}{2\sqrt{T_2 K_4}} & (29) \\ \quad = \dfrac{1}{2}\sqrt{\dfrac{C_1 R_2}{C_2 R_3}}\,\dfrac{R_3 + 2R_4}{R_4} & (30) \end{cases}$$

Symbol $\zeta$ in the equation (29) denotes a damping factor. When the value of the damping factor $\zeta$ is smaller than 0.1, the hunting phenomenon develops conspicuously in which the screen vibrates transiently when the power source circuit is closed.

If the aforementioned practical examples are substituted, there is obtained, $$\zeta = \dfrac{\sqrt{1\,\text{mF}\,2\Omega \times 1.18}}{2\sqrt{60\,\text{msec} \times 0.18}} = 0.25 > 0.1$$

That is, since $\zeta > 0.1$ in this embodiment, the hunting phenomenon does not develop conspicuously.

In other words, the following equation should be satisfied to prevent the occurrence of strong hunting, i.e., $$\zeta = \dfrac{1}{2}\sqrt{\dfrac{C_1 R_2}{C_2 R_3}}\,\dfrac{R_3 + 2R_4}{R_4} \geqq 0.1 \quad (31)$$

As an auxiliary means for further alleviating the hunting, it is recommended to insert a resistance element (about 100 ohms) in series with a branch of the capacitor $C_2$ in FIG. 1 though it is not specifically diagrammed.

The equation (27) is substituted for the equation (26) to obtain the following equation, $$\dfrac{E_2(1 + AE_2{}^2)}{E_{11}} = \dfrac{\dfrac{PC_1 R_2}{K_4}(1 + pT_2)}{1 + 2\zeta\tau p + (\tau p)^2} = \quad (32)$$

$$\dfrac{(\tau p)^2\left(1 + \dfrac{1}{PT_2}\right)}{1 + 2\zeta\tau p + (\tau p)^2} = \dfrac{1 + \dfrac{1}{PT_2}}{1 + 2\zeta\dfrac{1}{\tau p} + \left(\dfrac{1}{\tau p}\right)^2}$$

The transient vibration at the time when the power source circuit is closed can be evaluated depending upon this equation.

The circuit constants can be selected such that the value of $\zeta$ will become greater than 0.1 as mentioned above, thereby to prevent the occurrence of transient vibration.

Described below is the structure of the third order distortion wave generating circuit (21 of FIG. 3).

Figure 5:
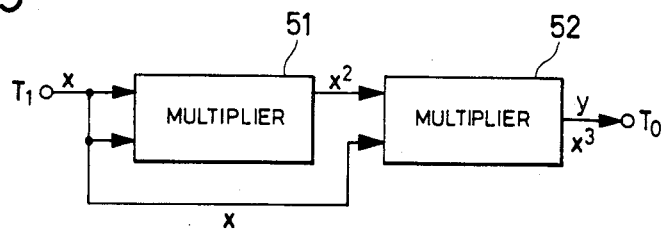
FIGS. 5 to 9 are block diagrams or circuit diagrams illustrating the structures of third order distortion wave generating circuits according to different embodiments.

FIG. 5 illustrates a third order distortion wave generating circuit which consists of two multiplier circuits, wherein reference numerals 51 and 52 denote multiplier circuits. When the input is x, the output y is equal to $x^3$. The multiplier circuits may be the widely known ones.

Figure 6:
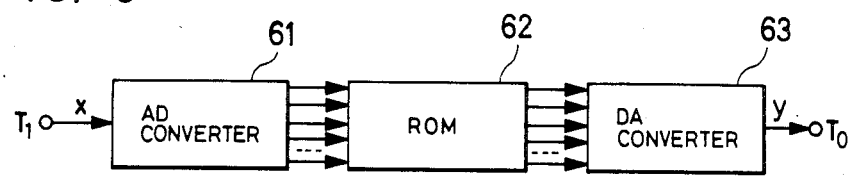

FIG. 6 illustrates a third order wave generating circuit utilizing the digital technology, wherein reference numeral 61 denotes an AD converter circuit. The digital circuit of this circuit is connected to address inputs of a ROM (read-only memory) denoted by 62, and the data output of the ROM is connected to a DA converter denoted by 63. The data $x^3$ is stored in advance in an x-address of the ROM. This makes it possible to obtain a desired output $x^3$ on the output terminal y.

Figure 7:
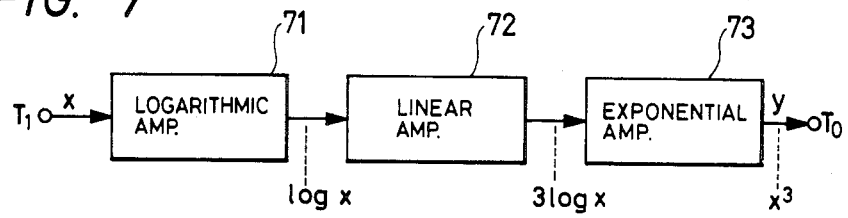

FIG. 7 illustrates an embodiment which employs a logarithmic amplifier. In FIG. 7, reference numeral 71 denotes a logarithmic amplifier which produces an output log x. Reference numeral 72 denotes a linear amplifier which offers a gain of three folds and which produces an output 3 log x. Reference numeral 73 denotes an exponential amplifier which produces an output $x^3$. The logarithmic amplifier 71 receives the input of positive polarity only. For the input of negative polarity, therefore, the polarity is separately inverted, and the input is processed in parallel by a circuit similar to that of FIG. 7 and, . then, the input whose polarity is inverted is added to the output of FIG. 7.

Figure 8:
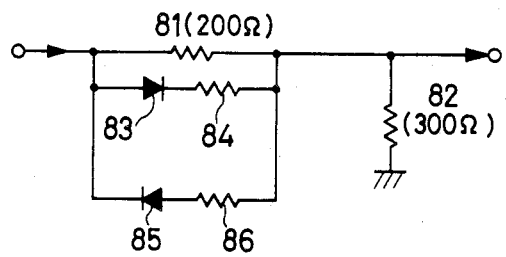

FIG. 8 illustrates a combination of the third order wave generating circuit and the adder (21 and 22 of FIG. 3), wherein reference numerals 83 and 85 denote diodes, and 84 and 86 denote resistors having a resistance of several hundred ohms. It will be comprehended that the diodes 83 and 85 help produce a waveform similar to that of FIG. 4c.

Figure 9:
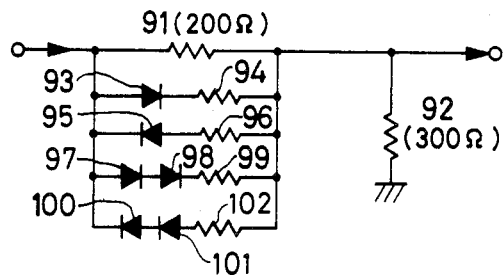

In the circuit of FIG. 8, if a non-linear circuit having an increased number of diodes is added in parallel with a series branch which couples the input and output together, the precision of compensation can be further improved. FIG. 9 illustrates an example thereof. As will be obvious from the circuit of FIG. 9, there are connected diodes 93, 95, 97, 98, 100, 101 and resistors 94, 96, 99, 102 in parallel with the resistor 91 (200 ohms). Reference numeral 92 denotes a resistor (300 ohms in this embodiment).

In the foregoing were described fundamental embodiments of the present invention. Next, described below are modified embodiments.

In deriving the equation (25) from the equation (15), the second term in parenthesis in the right side of the equation (15) was neglected. When this term cannot be neglected, however, there develops distortion in which the upper part of the screen extends and the lower part contracts. In the circuit of FIG. 8, in this case, the diode 83 and the resistance 84 in series therewith are selected to have small values, and the diode 85 and the resistance 86 in series therewith are selected to have large values, in order to compensate the asymmetrical distortion.

In addition to the structure of the embodiment shown in FIG. 3 of the present invention, it is also allowable to use in combination a circuit of the potentiometer 10 of the positive feedback loop of FIG. 1 that is employed in the conventional art.

According to the embodiments of the present invention mentioned in detail in the foregoing, the effects are obtained as described below:

(1) Degradation in the linearity of the screen can be reduced to less than one-half that is caused by the aging and change of the chemical capacitors that were problems inherent in the conventional art.

(2) Degradation in the linearity of the screen can be reduced to less than one-half that accompanies the change in the ambient temperature.

(3) The effect for compensating the linearity that is in reverse proportion to the square power of the vertical scanning frequency of the signal source, can be maintained independently of the frequency. Therefore, the linearity can be uniformly compensated for a wide range of frequencies.

What is claimed is:

1. In a vertical deflection circuit comprising a sawtooth wave generating circuit, a negative feedback amplifier which receives the output of said sawtooth wave generating circuit, a vertical deflection yoke circuit connected to the output part of said amplifier, and a feedback circuit which is provided between said deflection yoke circuit and the input part of said negative feedback amplifier to transmit feedback signals, a vertical deflection circuit of the negative feedback type wherein said feedback circuit is provided with a third order distortion wave generating circuit so that third order distortion of positive polarity is included in said feedback signals, and that third order distortion of negative polarity is included in the deflection current of said deflection circuit.

2. A vertical deflection circuit of the negative feedback type according to claim 1, wherein a voltage that generates at a terminal of a deflection current detector resistance connected in series with the vertical deflection yoke, is applied to an adder via said third order wave generating circuit, the voltage that generates at the terminal of said deflection current detector resistance is directly applied to said adder, and the output of said adder is applied to the input part of said negative feedback amplifier.

3. A vertical deflection circuit of the negative feedback type according to claim 1 or 2, wherein said third order distortion wave generating circuit is comprised of a first multiplier and a second multiplier, and either a part of the input to the first multiplier or the output of the first multiplier is added to the second multiplier, such that the second multiplier will generate a third order distortion wave.

4. A vertical deflection circuit of the negative feedback type according to claim 1 or 2, wherein said third order distortion wave generating circuit is comprised of an AD converter circuit, a ROM (read-only memory) having an address input part connected to the digital circuit of said AD converter circuit, and a DA converter circuit which receives the data output from said ROM, and wherein the data $x^3$ is stored in advance in an x-address of said ROM.

5. A vertical deflection circuit of the negative feedback type according to claim 1 or 2, wherein said third order distortion wave generating circuit is comprised of a logarithmic amplifier which receives an input x, a linear amplifier which receives an output log x from said logarithmic amplifier and which produces a gain of three folds, and an exponential amplifier which receives the output 3 log x from said linear amplifier and which produces an output $x^3$.

6. A vertical deflection circuit of the negative feedback type according to claim 1 or 2, wherein said third order distortion wave generating circuit is comprised of a resistor, and at least two circuits connected in parallel with said resistor, each of said circuits being made up of a resistor and a diode connected in series, and wherein the directions of polarities of said diodes are different between said two circuits that are connected in parallel.

* * * * *